F. I. KIMBALL

July 29, 1930.

BALL BEARING DOOR HINGE

Re. 17,748

2 Sheets-Sheet 1

Original Filed Jan. 24, 1924

Inventor

Frank I. Kimball

By Henry E. Rockwell

Attorney

July 29, 1930.

F. I. KIMBALL

BALL BEARING DOOR HINGE

Re. 17,748

2 Sheets-Sheet 2

Original Filed Jan. 24, 1924

Inventor

Frank I. Kimball

By Henry E. Rockwell

Attorney

Reissued July 29, 1930

Re. 17,748

UNITED STATES PATENT OFFICE

FRANK I. KIMBALL, OF WEST HAVEN, CONNECTICUT, ASSIGNOR TO SARGENT & COMPANY, OF NEW HAVEN, CONNECTICUT

BALL-BEARING DOOR HINGE

Original No. 1,580,257, dated April 13, 1926, Serial No. 688,226, filed January 24, 1924. Application for reissue filed October 14, 1927. Serial No. 226,253.

This invention relates to hinges, and more particularly to that type of the same usually referred to as a butt hinge, such as is commonly used in connection with the hanging of doors. As usually made, such hinges comprise a pair of leaves attached to the door frame and door, the leaves being provided with knuckles having aligned openings through which a hinge pin is passed, the door swinging about the axis of this pin. Such hinges are subject to the disadvantage of rusting or corroding so that they work less easily than when in good condition and moreover are quite liable to make an objectionable noise or squeak when the door is moved.

One object of my invention is to overcome the disadvantage referred to above and provide a door hinge which will operate easily at all times, and which will be practically noiseless in operation.

A further object of the invention is to provide a hinge of this character with ball bearings which bear the weight of the door so that the parts of the hinge will move with greater freedom and less friction.

A still further object of the invention is to provide a new and improved method of mounting the ball bearing races in the hinge so that they will be mounted securely in place, in an economical, simple and effective manner.

To these and other ends the invention consists in the novel features and combination of parts to be hereinafter described and claimed.

Figure 1:
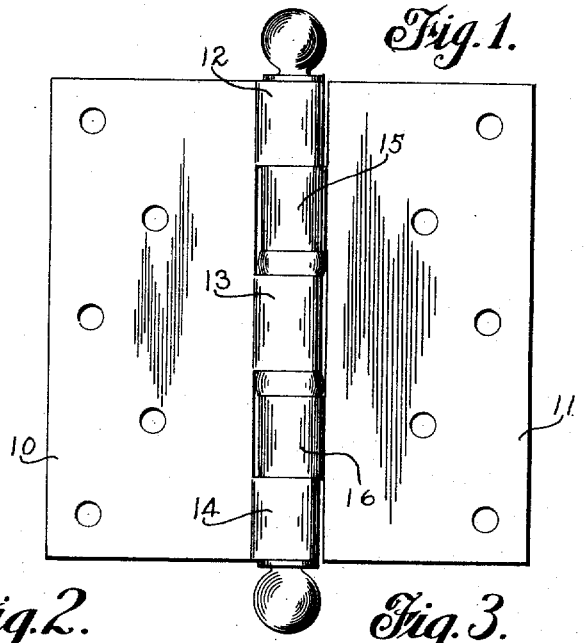
Fig. 1 is an elevational view of a hinge in open position embodying my improvements.
Figure 2:
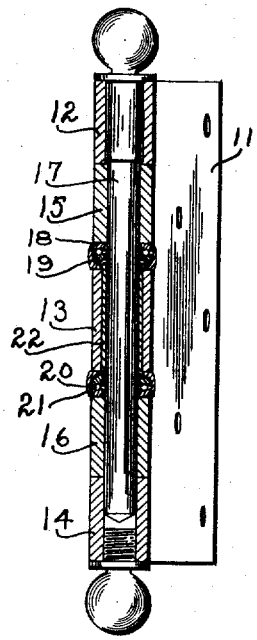
Fig. 2 is a sectional view through the hinge pin.
Figure 3:
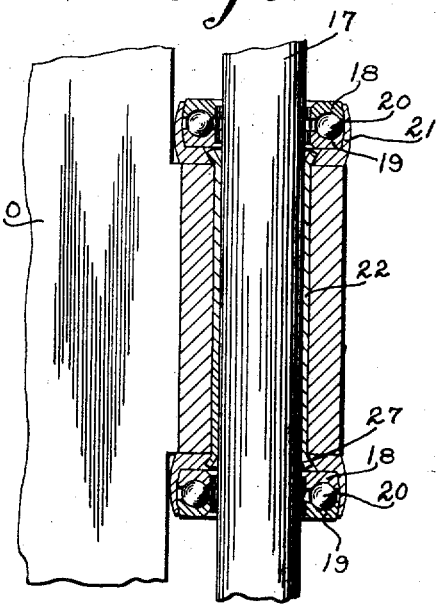
Fig. 3 is an enlarged sectional view through the hinge knuckle adjacent to which the ball bearing races are mounted.

The particular hinge which I have selected to illustrate and describe, comprises a pair of leaves 10 and 11, one of which is adapted to be connected to the door frame and the other to the door or object to be hingedly supported. The leaf 10 as shown, is provided with the knuckles 12, 13 and 14, and the leaf 11 with the knuckles 15 and 16 which are designed to be received between the knuckles upon the leaf 10. All of the knuckles, as shown in Fig. 2, are provided with aligned openings through which may be passed the hinge pin 17 to secure the two parts of the hinge together. According to the usual practice, the door or swinging object may then be moved about the axis of the hinge pin, and upon the removal of this pin the door may readily be removed from the frame.

In order to provide greater freedom of action for the parts of the hinge and reduce friction as far as is practicable, I mount adjacent each end of the knuckle 13 a ball bearing, one of which is adapted to receive and sustain the weight of the door depending upon the position in which the hinge is used.

Figure 4:
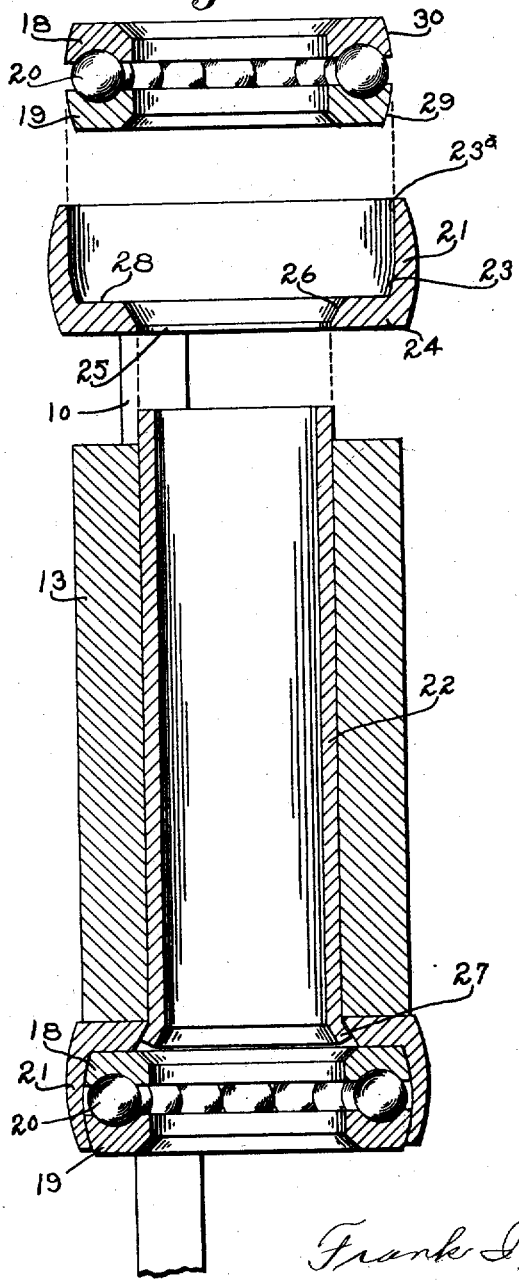
Fig. 4 is a composite view showing the manner of assembly of the parts.

These ball bearings comprise upper and lower races 18 and 19, between which are mounted the usual steel balls 20, the entire structure of the bearing being seated in a cup shaped support 21. To secure the bearings in position adjacent the ends of the knuckle 13, I insert within the bore of this knuckle a sleeve 22, as shown more particularly in Fig. 4. The sleeve is slightly longer than the knuckle so that its ends project above and below the upper and lower edges of the knuckle. It will, of course, be understood that the sleeve is cylindrical in shape when placed in position with its ends in alignment with the body thereof, as shown at the upper edge of the knuckle in the figure referred to.

The cup 21 comprises a body portion provided with an interior wall formed with a slight bevel adjacent the bottom of the cup cavity, as shown at 23. Above this beveled portion the cup wall, as originally made, and prior to the assembly of the parts, is substantially vertical, as shown at $23^a$ of Fig. 4. The bottom portion 24 of the cup is provided with a central opening 25. The edge of this opening may be beveled, as shown at 26, so as to flare outwardly and upwardly to assist in securing the cup in position. The cup is placed upon the upper face of the knuckle 13 with the end of the sleeve 22 projecting into the opening 25 and the wall of the sleeve at the projecting end thereof is flared outwardly as shown at 27, so as to overlie the beveled edge 26 of the opening. It will be apparent that the cup shaped container 21 will be effectively secured in position in this manner. Preferably the projecting portion of the sleeve 22 is sufficiently short so that its upper edge, after being flared outwardly in the manner described, will lie flush with or below the interior bottom surface 28 of the cup 21, so as not to interfere with the proper assembling of the remaining parts of the structure.

The ball bearing consisting of the two races 18 and 19 and the balls 20 is next inserted in the container 21, and it may be noted that the edges of the races 18 and 19 are slightly tapered, as shown at 29 and 30. The lower race is designed to fit snugly in the lower tapered portion 23 of the cup 21. After the bearing has been placed in the cup, the upper edge of the latter may be displaced inwardly to a slight extent by any suitable operation, such as spinning, for example, so as to embrace the tapered edge 30 of the race 18 and hold the bearing against displacement.

It will be apparent that I have provided a simple and economical method of securing the ball bearings in position and that both of the bearings at the opposite edges of the knuckle 13 are held in place by the same sleeve 22 in an effective manner. Not only are the bearings held in place effectively but they are adapted for free and frictionless operation, as the remaining parts of the structure do not, in any way, interfere with the rotation of the bearing races. The outer edge of the outermost race preferably projects slightly beyond the edge of the cup 21 so that the knuckle of the leaf 11 will contact therewith and will be kept free from engagement with the edge of the cup.

While I have shown and described a preferred embodiment of my invention, it will be understood that it is not to be limited to all the details shown, but is capable of modification and variation within the spirit of the invention and within the scope of the appended claims.

What I claim is:

1. A hinge of the character described, provided with leaves having inter-engaging knuckles, a bearing container positioned at one edge of one of the knuckles, means engaged directly with the container and the knuckle to secure the former in position and a ball bearing mounted in said container.

2. A hinge of the character described, provided with leaves having inter-engaging knuckles, a bearing container positioned at one edge of one of the knuckles, means engaged directly with the container and the knuckle to secure the former in position and a ball bearing mounted in said container and secured against removal therefrom.

3. A hinge of the character described, provided with leaves having inter-engaging knuckles, a cup-shaped bearing container positioned at one edge of one of the knuckles, means engaged directly with the container and the knuckle to secure the former in position, and a ball bearing mounted in said cup-shaped container.

4. A hinge of the character described, provided with leaves having inter-engaging knuckles, a ball bearing unit positioned at the end of one of said knuckles, said unit comprising a cup-shaped bearing container and ball bearing races therein, means engaging said container and the knuckles to secure the former in position, and means to secure the bearing races against removal from said container.

5. In a door hinge, a pair of leaves having inter-engaging knuckles, a cup-shaped bearing member secured upon one edge of one of said knuckles and having a bottom portion lying against the surface of the knuckle and provided with an opening registering with the knuckle bore, a ball bearing mounted in said container and secured against removal therefrom, said bearing comprising upper and lower races and anti-friction members between said races, and means to secure said container to the knuckle, comprising a retaining member secured in the knuckle bore and projecting therefrom a distance substantially equal to the thickness of the bottom of the container, the projecting end of said member entering the opening in the bottom of the container and being engaged with the wall of said opening below the bearing races.

6. A hinge, including a leaf provided with a knuckle having a bore therethrough, a container mounted upon said knuckle, means secured in the bore of said knuckle and engaged directly with the container to hold the latter in position, and a ball bearing mounted in said container.

7. A door hinge, including a leaf provided with a knuckle having a longitudinal bore therethrough, a container disposed at each edge of the knuckle, a member passing through the bore of the knuckle and having its ends directly engaged respectively with said containers to secure them in position, and a ball bearing mounted in each of said containers.

8. A door hinge, comprising a leaf provided with a knuckle having a bore therethrough, a cup-shaped container seated upon the edge of the knuckle, the bottom of said container abutting the edge of the knuckle and being provided with an opening registering with the bore of the knuckle, and means secured in the bore of the knuckle and engaged with the bottom of the container to hold the latter in place, and a ball bearing mounted in the container.

9. A door hinge, including a leaf provided with a knuckle having a bore therethrough, a cup-shaped container positioned at each edge of the knuckle, the bottom of each of said containers abutting the edge of the knuckle and being provided with an opening registering with the knuckle bore, a sleeve mounted in the bore of the knuckle and having its ends projecting into the openings in the bottom of the containers, the wall of said sleeve at the ends thereof being displaced to engage the bottom of the containers to hold them in position, and a ball bearing positioned in each of said containers.

10. In combination, a door hinge including a leaf provided with a knuckle having an opening therethrough, a cup-shaped container positioned upon one edge of the knuckle, the bottom of said container being provided with an opening, the edge of which is beveled to flare in a direction away from said knuckle, a sleeve mounted in the knuckle and having its end projecting into the opening of the container, the wall of the sleeve at said end being flared outwardly to overhang the beveled edge of the container opening, and a ball bearing mounted in said container.

11. A door hinge including a leaf provided with a knuckle, having a bore therethrough, a cup-shaped container positioned at each edge of the knuckle, each of said containers being provided with an opening having a beveled edge flaring outwardly in a direction away from the knuckle, and a sleeve mounted in the knuckle bore and having its ends projecting into the openings of the containers and there flared outwardly to overhang the beveled edges of said openings to secure the containers in place, and a ball bearing secured in each of said containers.

12. A hinge of the character described, provided with leaves having inter-engaging knuckles, a bearing unit seated upon the edge of one of said knuckles, comprising a bearing container and ball bearing races operatively mounted therein, means secured in the bore of said knuckle and engaging said container below the bearing races to secure the unit in place upon the knuckle.

13. A hinge of the character described, provided with leaves having inter-engaging knuckles, a bearing unit seated upon the edge of one of said knuckles, comprising a bearing container and ball bearing races operatively mounted therein, a sleeve secured in the bore of said knuckle, and having its end engaged with said container below the bearing race to secure the bearing unit in position upon the knuckle.

14. A door hinge comprising a pair of leaves having inter-engaging knuckles, a bearing unit secured upon one edge of one of said knuckles, said unit comprising a cup-shaped container containing bearing races with anti-friction members therebetween, and means for securing said bearing unit to the knuckle independently of said races.

15. A hinge of the character described, provided with leaves having inter-engaging knuckles, a bearing container positioned at one edge of one of the knuckles, means secured in and projecting from the bore of the knuckle and engaged directly with the container and with the knuckle to secure the former in position, and bearing members mounted in said container.

16. A door hinge comprising a leaf provided with a knuckle having a longitudinal bore therethrough, a container disposed at each edge of the knuckle, a member passing through the bore of the knuckle and having its ends directly engaged respectively with said containers to secure them in position, and co-operating bearing members mounted in said containers.

In witness whereof, I have hereunto set my hand this 12 day of Oct., 1927.

FRANK I. KIMBALL.